Patented Apr. 27, 1943

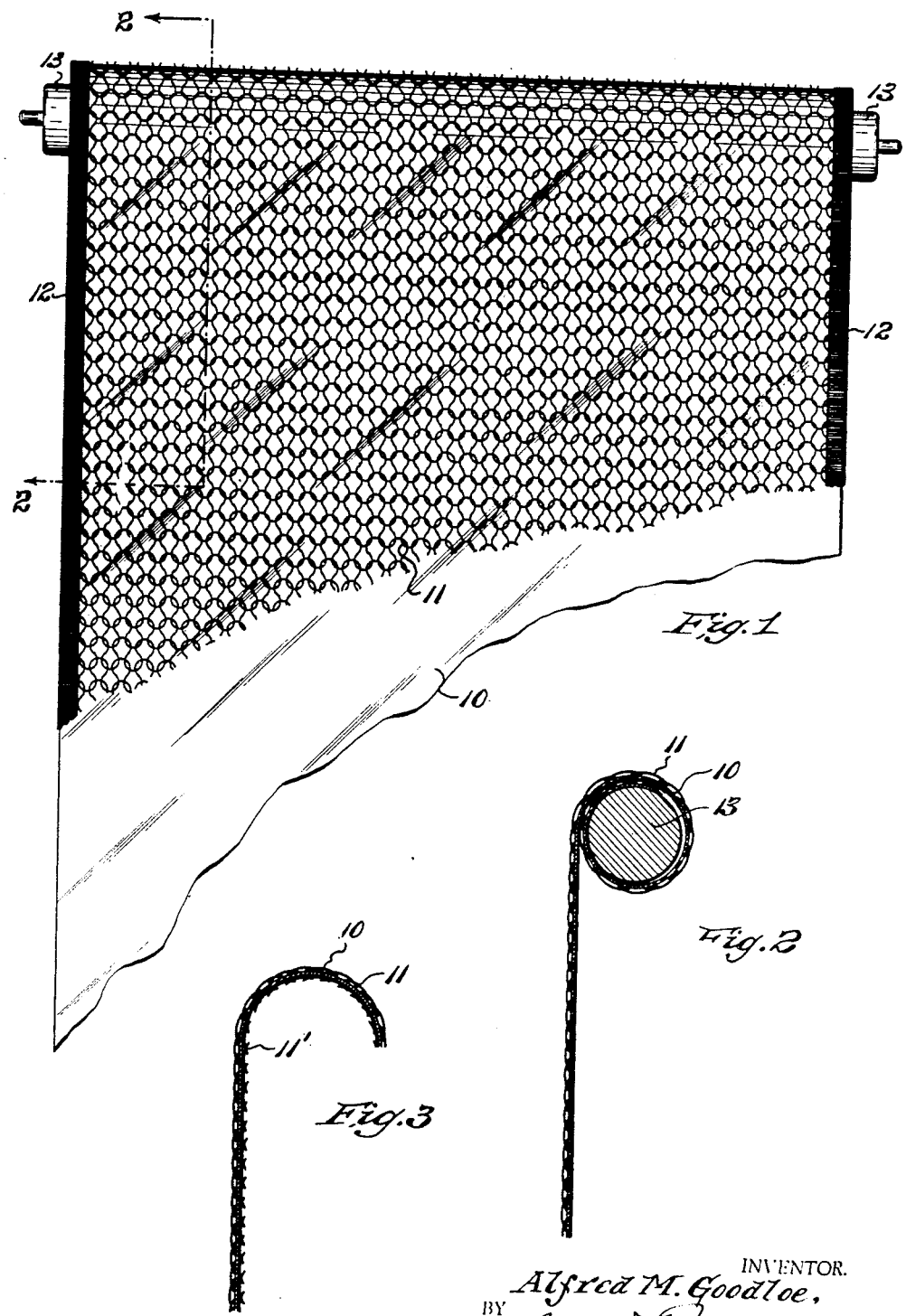

2,317,452

UNITED STATES PATENT OFFICE 2,317,452

BLACK-OUT SHADE

Alfred M. Goodloe, Montclair, N. J., assignor to Metal Textile Corporation, West Orange, N. J., a corporation of Delaware Application June 30, 1942, Serial No. 449,119

5 Claims. (Cl. 160—238)

This invention relates, generally, to light impervious material especially constructed for use in "black-out" door and window hangings, shades and the like.

The invention has for an object to provide a light impervious material which is reenforced against tearing, rupture or like injury, especially by shattered glass or other flying debris, and yet which is sufficiently flexible to allow the same to be readily rolled upon itself, thus permitting its attached mounting upon and for manipulation by rollers, such as shade or like rollers, whereby the same may be rolled up out of the way when not in use, as e. g. when mounted on a roller above a window or door opening to be served thereby, and yet rendered quickly available for convenient manipulation and use when required to be drawn down in covering relation to such window or door opening.

The invention has for another object to provide a light impervious sheet material with reenforcing and protecting facing or facings of knitted metallic wire mesh; the latter being so applied, secured and related to said sheet material as to freely flex therewith in at least one direction so as to permit of rolling of the resultant composite sheet upon itself or onto a carrying roller.

Other objects of this invention, not at this time more particularly enumerated, will be understood from the following description thereof.

Illustrative embodiments of this invention are shown in the accompanying drawing, in which:

Fig. 1 is a face view of a black-out shade according to the invention, parts thereof being broken away to show the elements comprising the same, and the same being shown as attached or mounted on a carrying roller; Fig. 2 is a fragmentary sectional view, taken on line 2—2 in Fig. 1; and Fig. 3 is a similar sectional view showing a modified construction of the shade material.

Similar characters of reference are employed in the above described views, to indicate corresponding parts.

In an illustrative embodiment of this invention, as shown in Figs. 1 and 2, the shade body comprises a sheet 10 of flexible light impervious material. Such light impervious sheet may consist of any kind of flexible material which is impenetrable by light rays, such for example as suitably filled, coated or otherwise treated cloth, paper or the like, or leather, rubber or other flexible sheet material which is per se light impervious by reason of its inherent characteristics.

The light impervious sheet 10 is provided in selected width and length suitable to adequately cover the window, door, or other opening desired to be blacked out thereby.

Superposed on at least one face of the light impervious sheet 10 is a correspondingly sized facing of metallic mesh 11. Said mesh facing comprises a fabric knitted from metallic wire of round, flat or other suitably cross-sectional shape. The wire may be made of any suitable metal, but preferably one which is reasonably resistant to oxidation and corrosion. The fabric may be knitted to provide a suitable mesh size, but preferably sufficiently small to efficiently fend off shattered glass or other flying debris against penetration of the mesh and attack upon the underlying light impervious sheet 10.

The superposed light impervious sheet 10 and knitted metallic fabric 11 are suitably secured together. This may be accomplished in many ways. Illustrative of one method of securing the sheet and fabric together, as shown in Fig. 1, comprises binding the marginal edge portions thereof by overedge stitching 12, whereby not only are these members adequately secured together in registered superposed relation, but also in a manner calculated to offer a minimum of impedance to the flexibility of the combined members, so that smooth rolling of the structure upon itself can be accomplished.

Knitted metallic fabrics possess a comparatively smooth face and an opposite comparatively rough face, the latter being formed by the projection therefrom of the interknit bights of the knitted loops of the mesh. Knitted metallic fabrics therefore possess a high degree of transverse flexibility in one direction, but a poor or low degree of such flexibility in the opposite direction. If it is attempted to flex the fabric in a direction which would dispose its smooth face at the under side of the flexure curve, the flexing action is immediately impeded by the movement of the loop bights toward and in abutment upon the loop legs passed therethrough, and consequently rolling of the fabric in such direction is prevented, or, if forced, results in such distortion of the wire as to prevent the fabric from returning to normal flat lying or spread condition. On the other hand, if the fabric is flexed in a direction which would dispose its rough face at the inner side of the flexure curve, the flexing action is free and unimpeded, since the loop bights move away from the loop legs passed therethrough, the loop bights hinging on said legs as fulcrums; and consequently the fabric may be easily and freely rolled upon itself in such direction without the least risk of wire distortion, and when unrolled again will quickly resume a flat lying or spread condition.

Due to these characteristics of the knitted metallic fabric, in order to assure a satisfactorily rollable composite shade structure comprising superposed light impervious sheet and knitted metallic fabric members, the latter should be applied with the rough or bight side facing in the direction of intended flexure of composite shade structure, i. e. facing toward the roller 13 by which the shade structure is carried and manipulated.

A satisfactory composite blackout shade of the kind described is afforded by a light impervious sheet 10 faced on one side only with the superposed knitted metallic mesh 11, as shown in Figs. 1 and 2. When so provided, the shade structure should be hung with the knitted metallic mesh facing 11 outward, that is toward the door or window opening to be covered thereby. If desired, however, both sides of the light impervious sheet 10 may be faced with knitted metallic mesh. This is shown in Fig. 3, wherein one side of the light impervious sheet 10 is faced with the knitted metallic mesh member 11, and the opposite side thereof is faced with a like knitted metallic mesh member 11'. It will be noticed in the showing of the latter arrangement, that the rough or bight side of the knitted metallic mesh members 11 and 11' both face in the direction of intended flexure.

Having now described my invention, I claim:

1. A composite blackout shade material comprising a sheet of light impervious material and knitted metallic fabric superposed thereon and secured thereto.

2. A flexible composite blackout shade material comprising a sheet of light impervious material faced with knitted metallic fabric, and means for uniting and binding contiguous marginal portions of said sheet and fabric.

3. A rollable blackout shade material comprising a flexible sheet of light impervious material having knitted metallic fabric superposed upon at least one face thereof, the bight roughened surface of said knitted metallic fabric facing in the direction of intended rolling flexure of said shade material, and means for uniting said sheet and fabric.

4. A rollable blackout shade material comprising a flexible sheet of light impervious material faced with superposed knitted metallic fabric having bight roughened surfaces thereof facing in the direction of intended rolling flexure of said shade material, and means for uniting said sheet and fabric at least along contiguous marginal portions thereof.

5. A rollable blackout shade material comprising a flexible sheet of light impervious material faced with superposed knitted metallic fabric having bight roughened surfaces thereof facing in the direction of intended rolling flexure of said shade material, and flexible means for uniting and binding contiguous marginal portions of said sheet and fabric.

ALFRED M. GOODLOE.